Jan. 1, 1952      S. E. NORRIS      2,580,457
MEASUREMENT APPARATUS
Filed June 5, 1947
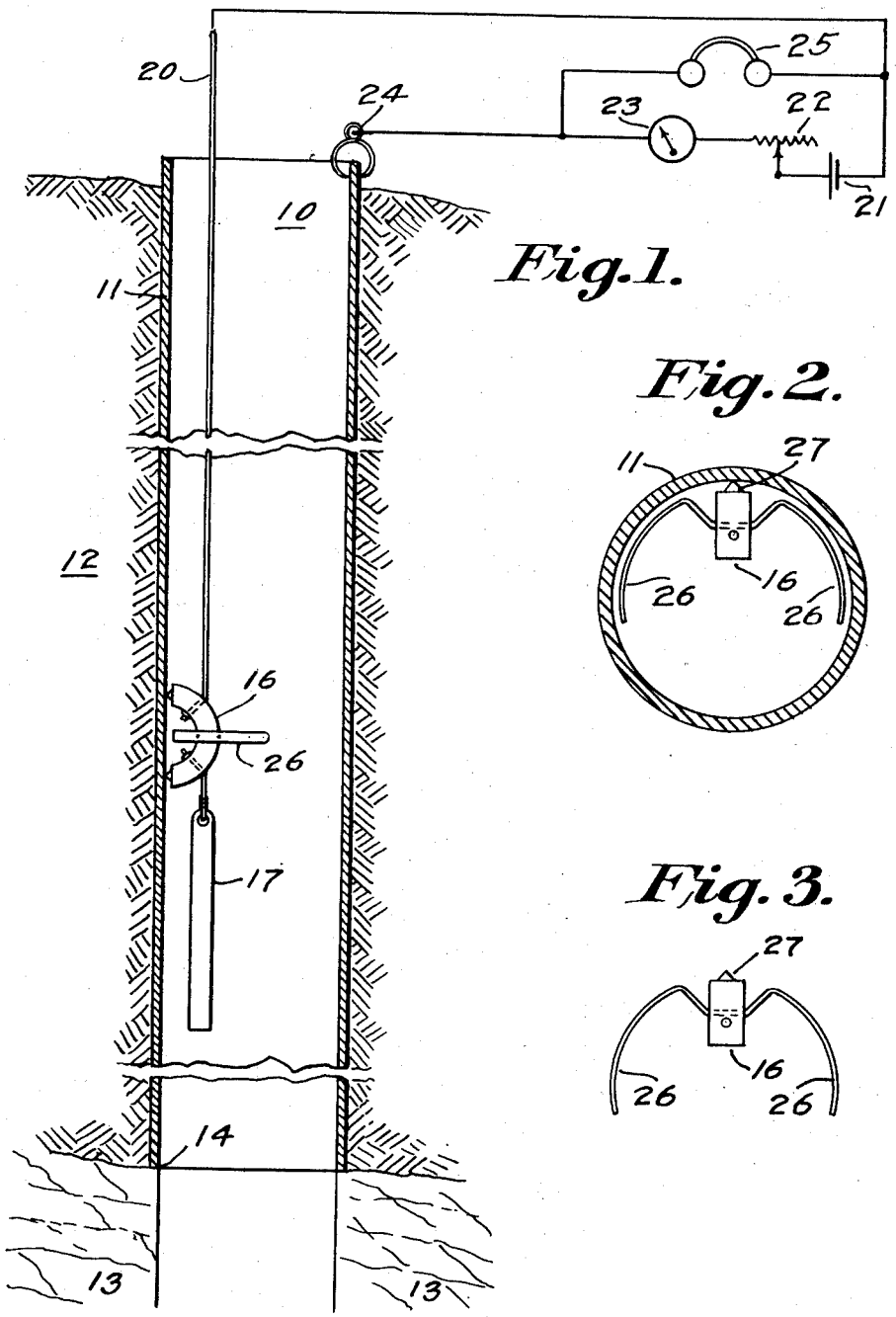
INVENTOR
STANLEY E. NORRIS
BY
ATTORNEY Patented Jan. 1, 1952

2,580,457

UNITED STATES PATENT OFFICE 2,580,457

MEASUREMENT APPARATUS

Stanley E. Norris, Grove City, Ohio, assignor to the United States of America as represented by the Secretary of the Interior Application June 5, 1947, Serial No. 752,791

2 Claims. (Cl. 33—125)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a measuring apparatus and more particularly to a method and apparatus for measuring the length of well casings for geological study.

It is important in a consideration of ground water problems in a glaciated area to know the thickness of drift and the depth from the surface to bedrock. If the depth of bedrock is known at a sufficient number of points it is possible to draw contours of the bedrock surface which indicate the character, size and shape of former drainage systems. The positions of these buried valleys are highly important as these filled channels are often excellent sources of large quantities of water.

Heretofore in most areas the only methods available to determine the thickness of drift have been by geophysical means or by obtaining records of drilled wells. Determination of thickness of drift by geophysical methods is slow, expensive and sometimes inaccurate. When the determination is made from records of drilled wells, unless costly test drilling is resorted to, the only source of information is that obtained from well drillers. Since few drillers keep records of this sort this method usually yields poor results.

Since with the common drop tool method of drilling the bit works inside the casing as the well is deepened, the size of the hole is slightly smaller than the diameter of the casing. The casing can, however, be driven through the relatively non-resistant glacial drift but not into resistant bedrock formations. Consequently, in most rock wells the casing is driven only to the top of the consolidated rock formations and the balance of the well is drilled into the rock as an "open hole." Therefore, since in a well drilled into rock the length of the casing is usually the same as the depth to the rock surface it follows that a determination of the length of casing is a determination of the depth to the bedrock.

One object of this invention is to provide a means for determining the depth of bedrock.

Another object of this invention is to provide a simple apparatus for determining the length of a well casing.

Another object of this invention is to provide an apparatus for determining the length of a well casing in a well of small diameter.

Another object of this invention is to provide an apparatus for determining the length of well casing in an operating well without contaminating the contents of the well.

Another object of this invention is to provide a means for determining the length of a well casing operative in a well where a pump installation is in place.

These and other objects will be apparent from the following specification taken in connection with the accompanying drawing in which:

Fig. 1 is a schematic diagram involving the principles of my invention used in determining the length of a well casing.

Fig. 2 is a transverse section of a well casing showing a top view of the magnet used in this invention.

Fig. 3 is a detailed top view of the magnet used in this invention.

In Fig. 1 a well 10 is lined throughout its top portion with a casing 11. Casing 11 extends down through the glacial drift 12 to the upper surface of bedrock 13. The lower end 14 of casing 11 rests on bedrock 13. In well 10, magnetically adhering to casing 11 which is ordinarily constructed of iron or steel, is horseshoe shaped permanent magnet 16. Attached to magnet 16 is a weight 17 sufficiently heavy to cause magnet 16 to slide down while adhering to the inner surface of the casing 11.

Wire 20 is attached to magnet 16 making mechanical and electrical connection therewith. Wire 20 is in series with battery 21, adjustable resistor 22, meter 23 and clamp 24 preferably of the "alligator" type which is attached to the upper end of the casing 11. Meter 23 may be any meter which will indicate flow of relatively small current in the circuit and may be an ammeter or a volt meter. An ohm meter may be used in place of battery 21, resistor 22 and meter 23. Headphones 25 are connected in parallel with battery 21, resistor 22 and meter 23.

A guard 26 is attached to magnet 16 as shown in Figs. 1, 2 and 3. Guard 26 conforms to the inner surface of the casing 11 taken through a transverse section. Guard 26 is preferably made of insulated spring steel. Points 27 may be provided on the poles of magnet 16.

In the operation of this invention the magnet is placed inside the casing 11 with its poles vertically aligned and adhering magnetically to the inner surface of the casing. Weight 17 will cause magnet 16 to slide down the surface of casing 11 unless an upward force is transmitted to the magnet through wire 20. Magnet 16 is allowed to slide down along the surface of casing 11 while magnetically adhering to the inner surface thereof by paying out wire 20 at the top of the well. While magnet 16 is descending, the operator listens through headphones 25 and visually notes the indication of meter 23. As long as magnet 16 is sliding over the surface of casing 11 the varying contact resistance between well casing and magnet as the magnet slides over rust or scale will cause scratching in headphones 25. When the magnet slides off the bottom end of casing 11 at 14 there will be an abrupt additional tension on wire 20 as the magnet is no longer partially supported by its frictional and/or magnetic contact with the casing 11. At this time the scratching will stop in headphones 25 as there is no more current passing through the circuit and meter 23 will indicate zero. It will thus be seen that the arrival of the magnet at the end of the casing will be indicated by an increased pull in wire 20 by headphones 25 and by meter 23.

The length of wire from the top of the casing to the magnet at the instant that the magnet drops off the bottom of the casing may be determined by calibrations along the length of wire 20 or by suitably marking the point on the wire on a level with the top of the well and afterwards measuring the distance between this mark and the magnet.

Guard 26 serves to prevent the magnet from turning sideways in the casing as it descends and helps prevent the magnet from making contact with any pump pipes that may be installed in the well. It will be noticed that neither the magnet 16 nor the guard 26 would interfere with a coaxially located pump pipe.

It will be obvious that the weight 17 may be dispensed with if the weight of magnet 16 has such relation to the magnetic strength of magnet 16 and its frictional contact with well casing 11 that the magnet 16 will readily and positively slide down the well casing although magnetically adhering thereto without the addition of further weight.

It will be seen that this invention provides a particularly advantageous means for determining the length of a well casing for use in a geological survey or for any other purpose. Well drillers who are called on strange jobs for cleaning wells or for deeper drilling can also advantageously employ this device. The apparatus of this invention may be advantageously employed wherever it is desirable to determine the length of a well casing.

Many modifications of the above invention will occur to those skilled in the art. This invention is limited only by the scope of the appended claims.

The invention claimed is:

1. In combination a magnet sufficiently weighted to cause it to slide down a surface of ferromagnetic material while magnetically adhering thereto, a wire attached to said magnet, a means for connection to a well casing, a source of potential in series with said wire, said magnet and said connection means, and means for indicating current flow in said wire, said magnet having a substantially semi-circular guard attached to its mid-portion.

2. The combination of claim 1, in which points are provided on the poles of said magnet for making good electrical contact with said ferromagnetic surface.

STANLEY E. NORRIS.

REFERENCES CITED

The following references are of record in the file of this patent:

UNITED STATES PATENTS

| Number | Name | Date |
|---|---|---|
| 1,239,532 | Sponsel | Sept. 11, 1917 |
| 1,888,454 | Edson | Nov. 22, 1932 |
| 1,895,643 | Putnam | Jan. 31, 1933 |
| 1,993,877 | Dillon et al. | Mar. 12, 1935 |
| 2,397,254 | Ennis | Mar. 26, 1946 |